United States Patent [19]

Boirat

[11] Patent Number: 4,611,885
[45] Date of Patent: Sep. 16, 1986

[54] SWITCH FOR A LIGHT GUIDE CIRCUIT

[75] Inventor: Robert Boirat, Roinville, France

[73] Assignee: Compagnie Industrielle des Telecommincation Cit-Alcatel, Paris, France

[21] Appl. No.: 566,934

[22] Filed: Dec. 29, 1983

[30] Foreign Application Priority Data

Jan. 7, 1983 [FR] France .................. 83 00194

[51] Int. Cl.⁴ .................. G02B 6/00; G02B 6/36; G02B 6/38; G02B 21/56
[52] U.S. Cl. .................. 350/96.20; 350/96.10; 350/96.21; 350/117
[58] Field of Search .................. 350/96.20, 96.21, 117

[56] References Cited

U.S. PATENT DOCUMENTS 3,389,950  6/1968  Harper .................. 350/96.25
3,401,232  9/1968  Goldhammer et al. .................. 358/200
4,261,638  4/1981  Wagner .................. 350/96.20 X
4,304,460 12/1981  Tanaka et al. .................. 350/96.20 X

FOREIGN PATENT DOCUMENTS 0146645 11/1979 Japan .................. 350/96.19

Primary Examiner—William L. Sikes
Assistant Examiner—Akm E. Ullah
Attorney, Agent, or Firm—Sughrue, Mion, Zinn, Macpeak & Seas

[57] ABSTRACT

The key component of the switch is a transparent frusto conical block (2) having a small base (12) perpendicular to its axis and facing the end of a common light guide (14) and having an elliptical large base (22) inclined relative to the axis (4). The outer surface of the transparent cone is clad (18) with a transparent material of lower refractive index (18). The conical part serves to collimate light from the common guide into a substantially parallel beam of larger diameter than the light guide. The inclined large base (22) acts as a prism to deflect the collimated beam at an angle to the axis (4). The entire component is rotatable about the axis (4), thereby enabling the collimated beam (24) to be directed towards a selected "particular" component, e.g. one out of 24 light guides (26). Extra facets (32, 38) may be provided to divert a small portion of the light to a common control sensor (40) and to position sensors (36).

8 Claims, 3 Drawing Figures

SWITCH FOR A LIGHT GUIDE CIRCUIT

The invention relates to a switch for a light guide circuit.

BACKGROUND OF THE INVENTION

In general such a switch is intended for coupling one end, eg. the front end of a light guide which is hereinafter referred to as a "common" light guide, with an optical component which is selectable from a plurality of such components, hereinafter referred to as "particular" components. To facilitate the description, it will be supposed that the switch is used more particularly to direct light coming from the common guide and going towards a particular component. However, it must be understood that by virtue of the fact that light can travel in either direction along a given path, a switch which directs light towards a particular component is just as capable of injecting light from the particular component into the said guide.

The above-mentioned particular components may be constituted by detectors for example, but in fact they tend more often to be constituted by systems for injecting light into "particular" optical fibers. Similarly, the common guide is most often constituted by a "common" optical fiber.

In known manner such a switch includes:

collimator means for transforming a highly divergent beam leaving the front end of the common guide into a substantially parallel external beam of increased cross section; and controllable deflector means for deflecting said substantially parallel beam to direct it towards a selected particular component.

Naturally, said "collimator" means becomes "focusing" or "light injecting" means if the light is considered to be travelling towards the common guide.

One such known switch is described in U.S. Pat. No. 4,304,460 (Tanaka et al., assignors to Matsushita).

This known switch includes collimator means constituted by a lens and deflector means constituted by a rotatable mirror.

Such a switch may, for example, enable a user to select a program of interest from a plurality of television programs transmitted to the user over a plurality of optical fibers.

Given the very small transverse dimensions of the optical fibers used, this known switch is either extremely bulky in comparison with the fibers, or else it is very difficult to manufacture if light losses are to be kept as low as possible. In particular, the position of the rotatable mirror must be accurately defined both with respect to the collimator lens and with respect to said particular components.

Preferred embodiments of the present invention provide a light guide circuit switch which is simpler to manufacture and which causes little loss of light.

SUMMARY OF THE INVENTION

The present invention provides a switch of the above-mentioned type, wherein said collimator means and said deflector means are constituted by a rear portion and a front portion respectively of a single transparent block which is disposed in front of said end of the common guide, said rear portion constituting the core of a frusto conical guide of circular cross section about an axis and extending from a small base to a large base situated in two planes perpendicular to said axis, the small base constituting a rear face for said block and facing said end of the common guide, and the axis being disposed in line with the axis of the common guide in such a manner as to couple the frusto conical guide thereto, the conical side surface of said core being covered with by transparent cladding of lower refractive index than that of the transparent block in such a manner as to reflect light from a highly divergent beam leaving said fiber and to transform said beam into a nearly parallel beam passing through the large base of the truncated cone;

said front portion of said transparent block continuing from said rear portion beyond said large base of the frusto conical core whereby said large base is virtual, said front portion forming a deflecting prism having a main face which includes at least a portion of said large base and having its other main face inclined relative to the first and constituting a main front face of said block;

said switch further including means for rotating said transparent block about the axis of said truncated cone in such a manner as to control said deflector means constituted by the front portion of said block without affecting the operation of said collimator means constituted by the rear portion of the same block.

BRIEF DESCRIPTION OF THE DRAWINGS

A non-limiting manner of implementing the invention is described with the help of the accompanying diagrammatic figures. It must be understood that without going beyond the scope of the invention, the components which are described and shown may be replaced by other components which perform the same technical functions. When the same component appears in several of the figures, it is designated by the same reference symbol in each of them.

MORE DETAILED DESCRIPTION

Figure 1:
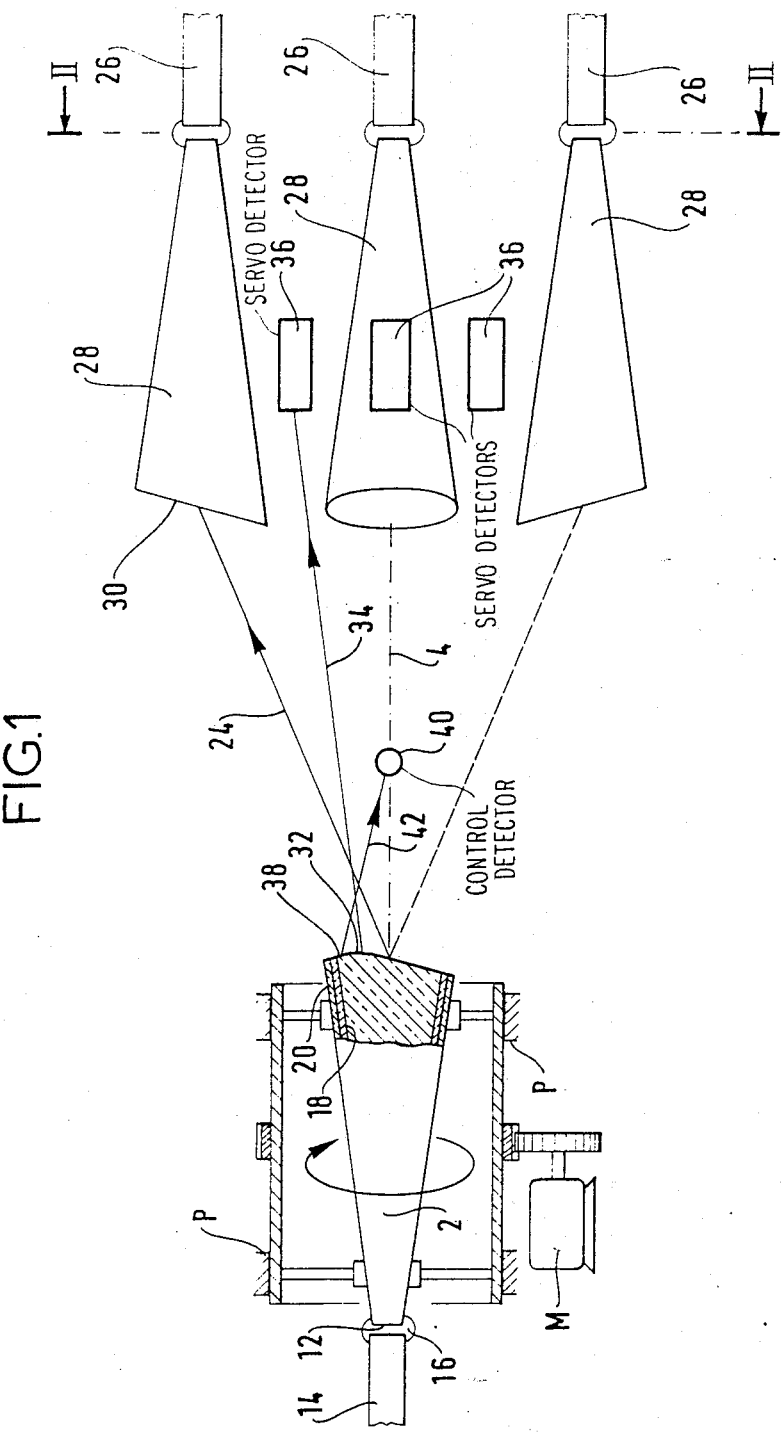
FIG. 1 is a longitudinal partially sectional view of a switch in accordance with the invention, the view being in section on a plane I—I of FIG. 2 passing through the optical axis of the switch.
Figure 2:
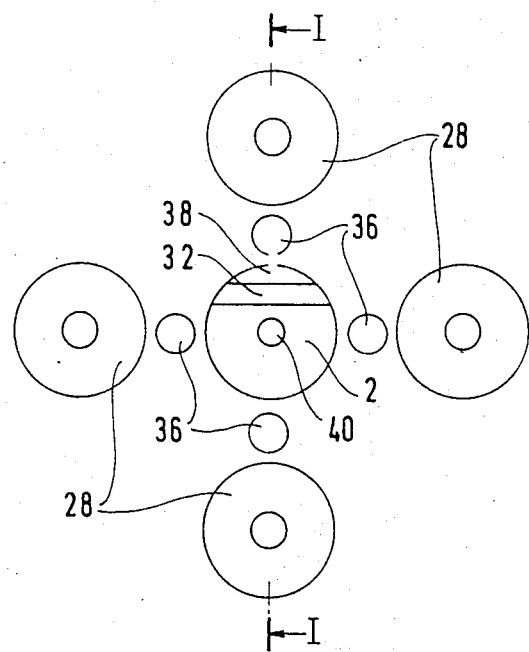
FIG. 2 is a vertical sectional view of the same switch in section on a plane II—II of FIG. 1 perpendicular to the switch axis.
Figure 3:
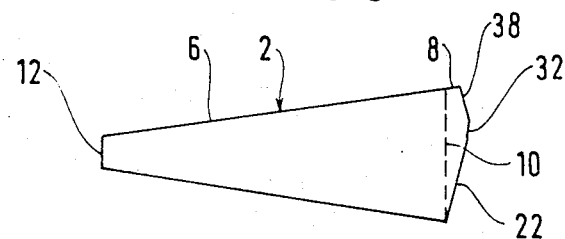
FIG. 3 is a view of just the transparent block of the same switch, the view being a section on the plane I—I and cross hatching being omitted, in order to show the virtual frontier between the front and the rear portions of the block.

As shown in the figures, the switch comprises a homogenous transparent block 2 made of doped silica glass and having the general shape of a truncated cone of circular section about a longitudinal axis 4 with a small base 12 at its rear end and perpendicular to the axis 4, and with a large sloping elliptical base at its front end. Although there is no physical frontier inside the block of glass, it may be considered as being constituted by a rear portion 6 and by a front portion 8 separated by a surface 10 (see FIG. 3).

The rear portion 6 constitutes the core of a frusto conical light guide. It comprises the above-mentioned small base 12, the above-mentioned truncated cone of circular cross section, and a large base which is constituted by the surface 10 which is parallel to the small base. The small base is substantially the same diameter as the core of a common optical fiber 14 and it is disposed opposite to and close to the front end of said fiber whose optical axis coincides with the axis 4. The refractive index of the block 2 is substantially equal to the refractive index of the fiber core, and a drop 16 of liquid also having the same refractive index fills the gap between the end of the fiber and the small base.

The conical outer surface of said rear portion is covered in transparent cladding 18 of lower refractive index than the block 2 in order to constitute a reflective surface for guiding light in known manner inside the light guide thus constituted. The conical shape of the reflecting surface progressively reduces the inclination relative to the axis of light rays leaving the common fiber. This occurs because of successive reflections at high angles of incidence. It is preferable to provide a second layer of cladding 20 surrounding the first layer of cladding 18 and having a higher refractive index than the layer 18, in order to avoid reflecting parasitic light rays at low angles of incidence which may enter the truncated cone via its large base. In practice, said layers of cladding cover not only the rear portion of the transparent block 2, but extend over its entire side surface as shown.

The front portion 8 of the block 2 constitutes a deflecting prism having one main face constituted by said virtual large base 10 of the rear portion, and having its other main face constituted by a "main" front face 22 of the block 2.

Further, the block is provided with means for rotating the block about its axis in such a manner that a longitudinal light beam arriving at said main face is deviated as it leaves it at 24 along a path which can be scanned over a cone about the axis 4. Said means include bearings P and a drive motor M. The small size of the block means that it can be housed inside the axial volume of the drive motor itself. The drive motor is a stepper motor. However, for the sake of clarity in the drawing, this disposition is not shown.

The external beam 24 leaving via the main front face 22 may be referred to as the "main" beam. It is received by a "particular" optical component which is constituted by an optical system for injecting light into a "particular" optical fiber such as 26 which runs parallel to the common fiber.

The injection system is constituted by a frusto conical block 28 having the same characteristics as the previously described block 2, except that it is fixed. The block 28 is coupled to the fiber 26 in the same way as the block 2 is coupled to the fiber 14. Its front face 30 is inclined in such a manner as to ensure that the light from the main beam 24 is injected into the optical fiber 26 when the main beam 24 is directed thereon.

In the example described, there are four particular fibers such as the fiber 26, distributed at 90° intervals from one another about the axis 4 and each of which is fitted with its own auxiliary members such as the injection system 28. However, in practice, it is more usual to provide a much larger number of particular fibers, eg. 24 or 25.

It may be of interest to be able to ensure automatically that the block 2 is accurately positioned about the axis 4, eg. when it is desired to inject light into the fiber 26 from the fiber 14, or more generally from the common guide.

It is thus preferable for the transparent block 2 to include a servo control facet 32 in its front face for controlling rotation of the block. The facet forms a moving servo beam 34 with a portion of the light coming from the common light guide and successively illuminates each servo detector 36 in a set of such light-sensitive detectors. The detectors are placed in a ring around the axis 4 at 90° intervals from one another. They control the drive motor M in such a manner as to lock the angular position of the block 2 to provide the desired optical coupling. This control is performed by a servo control circuit (not shown).

It may also be of interest to provide remote control of the angular position of the block 2 via the common guide.

It is thus preferable for the transparent block 2 to include another control facet 38 in its front face and oriented perpendicularly to the plane passing through its center and the axis of rotation 4 in such a manner as to form a control beam with the light from the common guide 14 and illuminating a control detector 40 placed on the axis 4. This enables the detector 40 to receive a control beam 42 from the block 2 independently of its angular position, thereby enabling the motor M to be controlled to bring the block 2 into the angular position for obtaining the desired optical coupling. Here too, control is provided by a circuit which is not shown.

A switch made in this manner thus operates as follows: A control signal and a servo signal are injected into the common fiber at a point upstream from its front end.

The control signal is conveyed by the control beam 42 together with the other signals and arrives at the detector 40 regardless of the angular position of the block 2. The detector 40 is sensitive only to the control signal in this context where the control signal propagates together with the main beam.

The servo signal may be much the same as the control signal, differing mainly with respect to addressing. It is conveyed together other signals by the servo beam 34. It is picked up by the selected servo detector 36 which is sensitive to said servo signal only, and then only when the angular position is correct or nearly correct.

The control signal causes the block 2 to be rotated until the servo detector corresponding to the desired position is illuminated, and the servo circuit then takes over to adjust the position accurately and to lock it.

Finally a "position achieved" signal sent by the servo detector to cause the servo signal to be turned off.

Naturally the functions of the detectors 36 and 40 can be retained even if the main light beam 24 is travelling towards the block 2.

Preferably, and as shown, the main front face 22 surrounds the axis of rotation 4, and each facet 32 or 38 is of smaller area and is located at a distance from the axis around the margins of the main face 22.

Also preferably, the facets 32 and 38 are disposed on the side of the main face which is closest to the longest generator lines of the truncated cone.

These last-mentioned two arrangements limit light losses suffered by the main beam by the presence of the facets.

The or each facet 32 or 38 may be formed by cleaving the block 2 or by casting the block in that shape during manufacture.

In practice two contiguous facets are used in order to facilitate manufacture.

One known method of making the block 2 is to draw down a "fat fiber" (having two materials of different refractive index) in a controlled manner when suitably heated.

Cleaving is done on the small side, as for a fiber, at a point chosen to obtain the correct diameter.

The large base 22 and the facets 32 and 38 are polished by conventional optical techniques.

Supposing the common fiber has a core diameter of 50 micrometers and provides a beam with a half-angle at the apex of about 10°, and supposing that a collimated beam having a half-angle of 1° or less is desired, the cone can be made of the same material as the fiber, have an angle at the apex of about 1° and extend for slightly more than 25 mm (from an inlet diameter of 50 micrometers). Inclining the outlet face by 25° gives an outlet beam which is deviated by about 13°.

I claim:

1. A light guide circuit switch for coupling a front end of a "common" guide at one end of said switch to a "particular" optical component selected from a set comprising a plurality of particular components at the other end of said switch, and in particular for directing light leaving said common guide towards said particular component, said switch comprising:

collimator means for transforming a highly divergent beam leaving the front end of the common guide into a substantially parallel external beam of increased cross section; and controllable deflector means for deflecting said substantially parallel beam to direct it towards said selected particular component;

the improvement wherein said collimator means and said deflector means are constituted by a rear portion and a front portion respectively of a single transparent block disposed in front of said end of the common guide;

said single transparent block including a core of a frustoconical guide of circular cross section about an axis and extending from a small base thereof to a large base thereof situated in two planes perpendicular to said axis, said core defining said rear portion, said small base constituting a rear face for said block and facing said end of the common guide, and the axis being disposed in line with the axis of the common guide in such a manner as to couple the frustoconical guide thereto, the conical side surface of said core being covered with transparent cladding of lower refractive index than that of the transparent block in such a manner as to reflect light from a highly divergent beam leaving said fiber and to transform said beam into a nearly parallel beam passing through the large base of the truncated cone;

said front portion of said transparent block continuing from said rear portion beyond said large base of the frustoconical guide core, said front portion forming a deflecting prism having a main rear face which includes at least a portion of said large base and having another face inclined relative to the first and constituting a main front face of said block;

said switch further including means for rotating said transparent block about the axis of said truncated cone in such a manner as to control said deflector means constituted by the front portion of said block without affecting the operation of said collimator means constituted by the rear portion of the block, such that the presence of said front portion of said transparent block causes collimated light to pass directly from said front portion inclined main front face of said block directly to said components in sequence solely upon rotation of said frustoconical guide about the axis.

2. A switch according to claim 1, wherein the conical side surface of said frusto conical guide is covered with an extra outer layer of transparent cladding of higher refractive index than the said cladding in order to avoid parasitic reflections at low angles of incidence to said side surface.

3. A switch according to claim 1, further comprising a set of servo detectors sensitive to light, said detectors being disposed at a distance from said axis of rotation and controlling said rotation means to lock the angular position of said block in a selected position, and wherein in the front portion, said transparent block further includes a servo facet which is displaced by said rotation of said block in such a manner as to form a moving servo beam with light from said common guide for successively illuminating each servo detector in said set of detectors sensitive to such light.

4. A switch according to claim 1, further comprising a control detector placed on said axis of rotation to receive via said block and independently of the angular position thereof, a control beam for controlling said rotation means in such a manner as to bring said block into a selected angular position, and wherein in its front portion, said transparent block further includes a control facet oriented parallel to a plane perpendicular to said axis of rotation in such a manner as to form a control beam with light from said common guide and suitable for illuminating said control detector.

5. A switch according to claim 3, wherein said front main face surrounds said axis of rotation, with each of said facets being of smaller area and being formed at a distance from said axis at the margin of said main face.

6. A switch according to claim 4, wherein said front main face surrounds said axis of rotation, with each of said facets being of smaller area and being formed at a distance from said axis at the margin of said main face.

7. A switch according to claim 3, wherein each of said facets is formed adjacent the longest generator lines of the truncated cone constituting said transparent block.

8. A switch according to claim 4, wherein each of said facets is formed adjacent the longest generator lines of the truncated cone constituting said transparent block.

* * * * *